Aug. 22, 1933.　　　　J. HOLAN　　　　1,923,785
MOTOR VEHICLE
Filed May 25, 1927　　　4 Sheets-Sheet 1

Aug. 22, 1933.   J. HOLAN   1,923,785
MOTOR VEHICLE
Filed May 25, 1927   4 Sheets-Sheet 2

Inventor
James Holan
By Kwiz Hudson & Kent
Attorneys

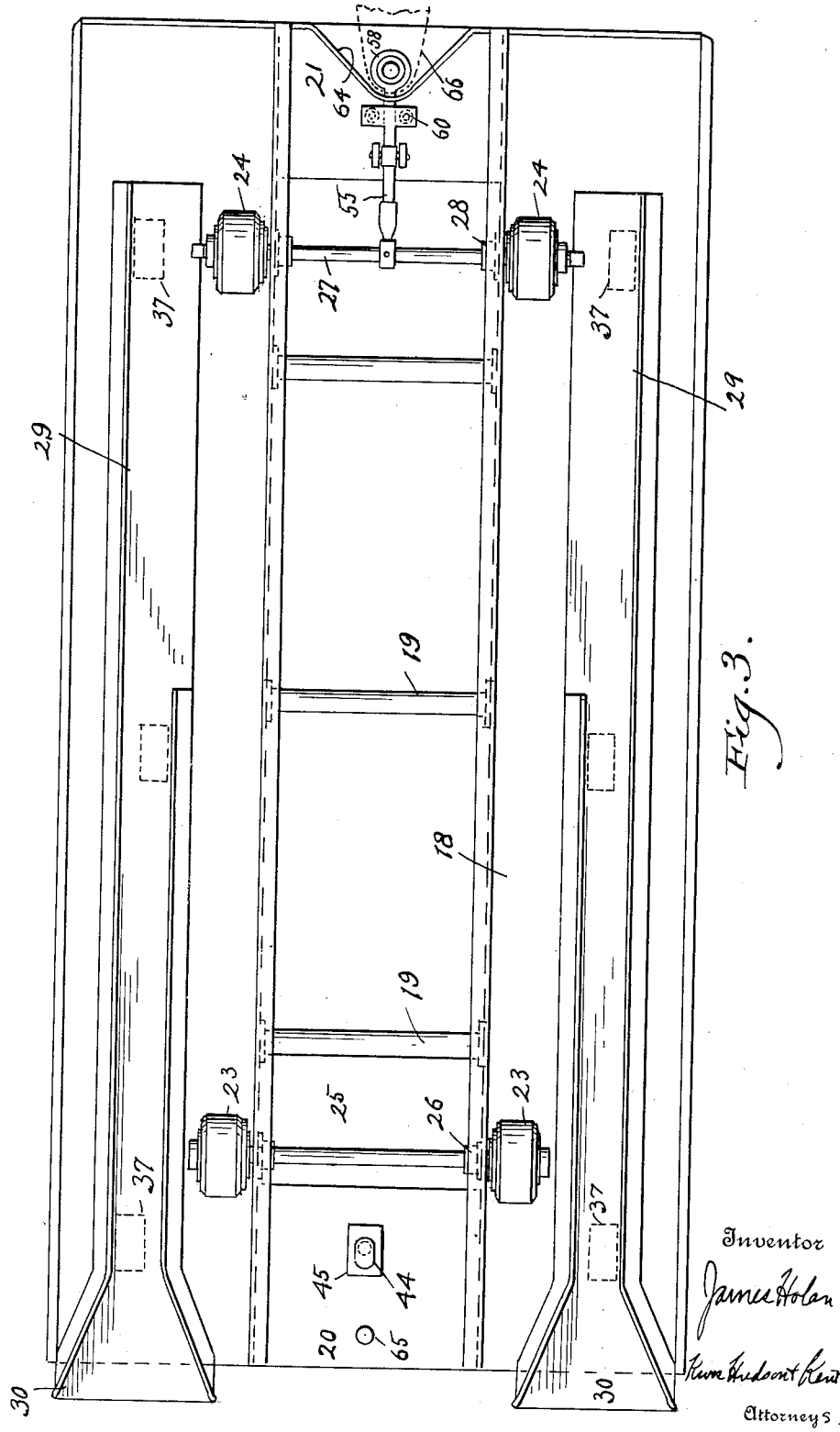

Aug. 22, 1933.    J. HOLAN    1,923,785
MOTOR VEHICLE
Filed May 25, 1927    4 Sheets-Sheet 4
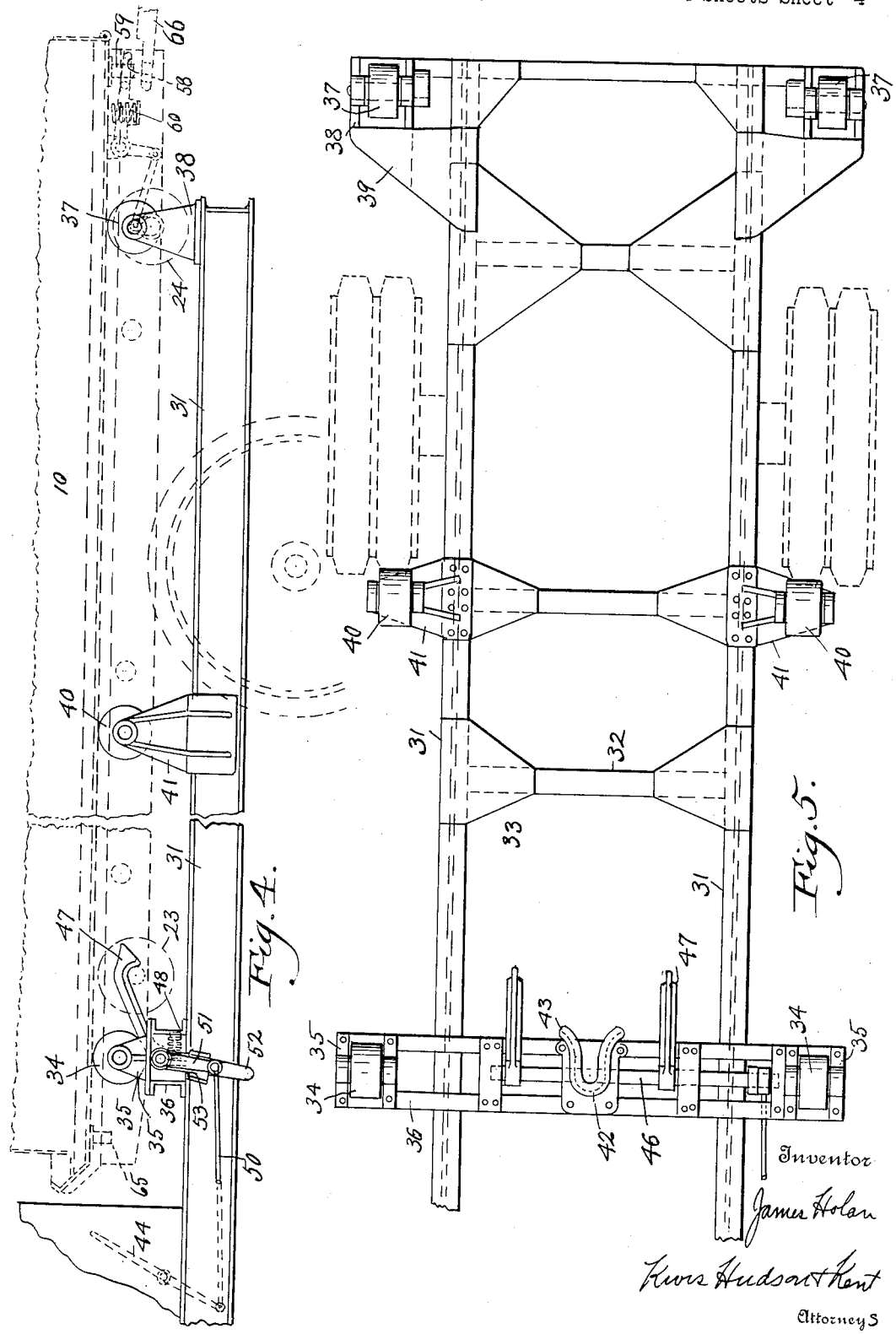

Patented Aug. 22, 1933

1,923,785

UNITED STATES PATENT OFFICE 1,923,785

MOTOR VEHICLE

James Holan, Cleveland, Ohio

Application May 25, 1927. Serial No. 193,984

6 Claims. (Cl. 214—38)

This invention relates to motor vehicles and more particularly to that type having demountable bodies adapted to be supported upon the chassis of the motor vehicle or to be self-supporting depending upon the use for which it is employed.

It is an object of the invention to provide efficient means for securing the demountable body to the chassis when the former is in proper position upon the latter so as to eliminate vertical or horizontal movement of the demountable body upon the chassis.

Another object of the invention is to provide means for guiding and properly positioning the demountable body upon the chassis when the former has been loaded to its capacity and it is desired to transfer the demountable body to other locations. A further object of the invention is to provide means for automatically locking the demountable body to the chassis when the former has been properly positioned upon the latter.

Another object of the invention is to provide a semi-automatic means for unlocking the demountable body from the chassis when it is desired to remove the former from the latter for the purpose of transferring the demountable body to its proper destination.

Another object of the invention is to provide a novel under structure for the demountable body which is simple and inexpensive to manufacture but provides the maximum strength and rigidity with a minimum of weight.

It is a well known fact that, in the present types of motor vehicles employed for the transportation of various articles, the motor vehicle is temporarily tied up during the loading and unloading of the articles which increases materially the cost of operation of the vehicle. The present demountable body is designed primarily for the purpose of eliminating this undesirable feature so that any number of demountable bodies may be loaded or packed at various points and moved to a convenient location in which the demountable body can be moved upon the chassis of the motor vehicle and transported to its proper destination. Furthermore, the demountable body embodying the present invention is adapted especially for use in warehouses and the like and has the special advantage that the articles loaded or packed therein can be sealed by the packer and shipped to the proper destination without the necessity of transferring the individual articles from one car to another. The body is particularly adapted for use in connection with what might be termed less than carload lots, in which case the demountable body can be loaded into the freight car and when delivered at its destination can be removed and delivered to the purchaser in this sealed condition. This eliminates the probability of injury and loss of the articles and materially aids in the handling of the articles while in the warehouses.

With the above objects indicated and other objects hereinafter explained in view, my invention consists in the construction and combination of elements hereinafter described and claimed.

Referring to the drawings:

Fig. 3 is a bottom plan view of the under structure of the demountable body.

Fig. 4 is a side elevational view of a portion of the chassis showing the position of the demountable body in dotted lines.

Fig. 5 is a top plan view of the demountable body supporting structure carried by the chassis.

Fig. 7 is a cross-sectional view showing the manner of locking the demountable body to the chassis.

Fig. 8 is an elevational view of the arrangement shown in Fig. 7.

Figure 1:
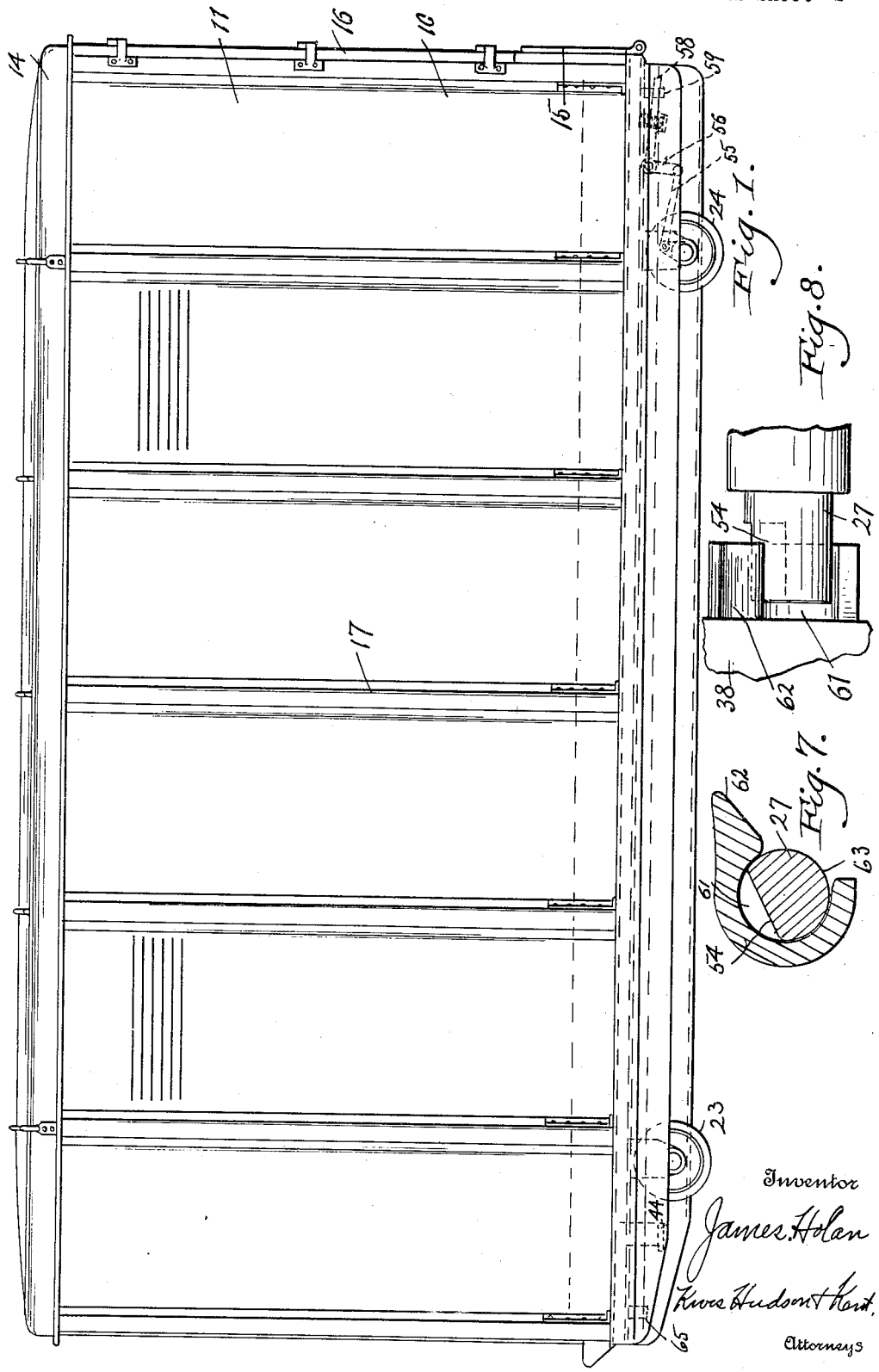
Fig. 1 is a side elevational view of the demountable body.

In the drawings, 10 represents generally the demountable body and consists of longitudinally extending side members 11 and a front member 12 which are suitably joined together and securely fastened to the floor 13. The body 10 is provided with a top 14 rigidly connected to the side and front members to form a weather-proof compartment in which the articles to be transported from one location to another are placed. The rear end of the body 10 is provided with a tail gate 15 pivotally connected to the floor 13, while at the upper portion of the body 10 is a pair of horizontally swinging doors 16 pivotally connected to the body 10. The swinging doors 16 and the tail gate 15 cooperate with each other to suitably enclose the rear end of the body 10. The side members 11 and front member 12 are provided with vertically extending reinforcing ribs 17 suitably spaced longitudinally throughout their length to provide a rigid and strong construction.

The special construction and arrangement of the side and front members do not form a part of the invention of the present application but are included in another application filed by me on the 25th day of May, 1927, and bearing Serial No. 193,985.

Figure 2:
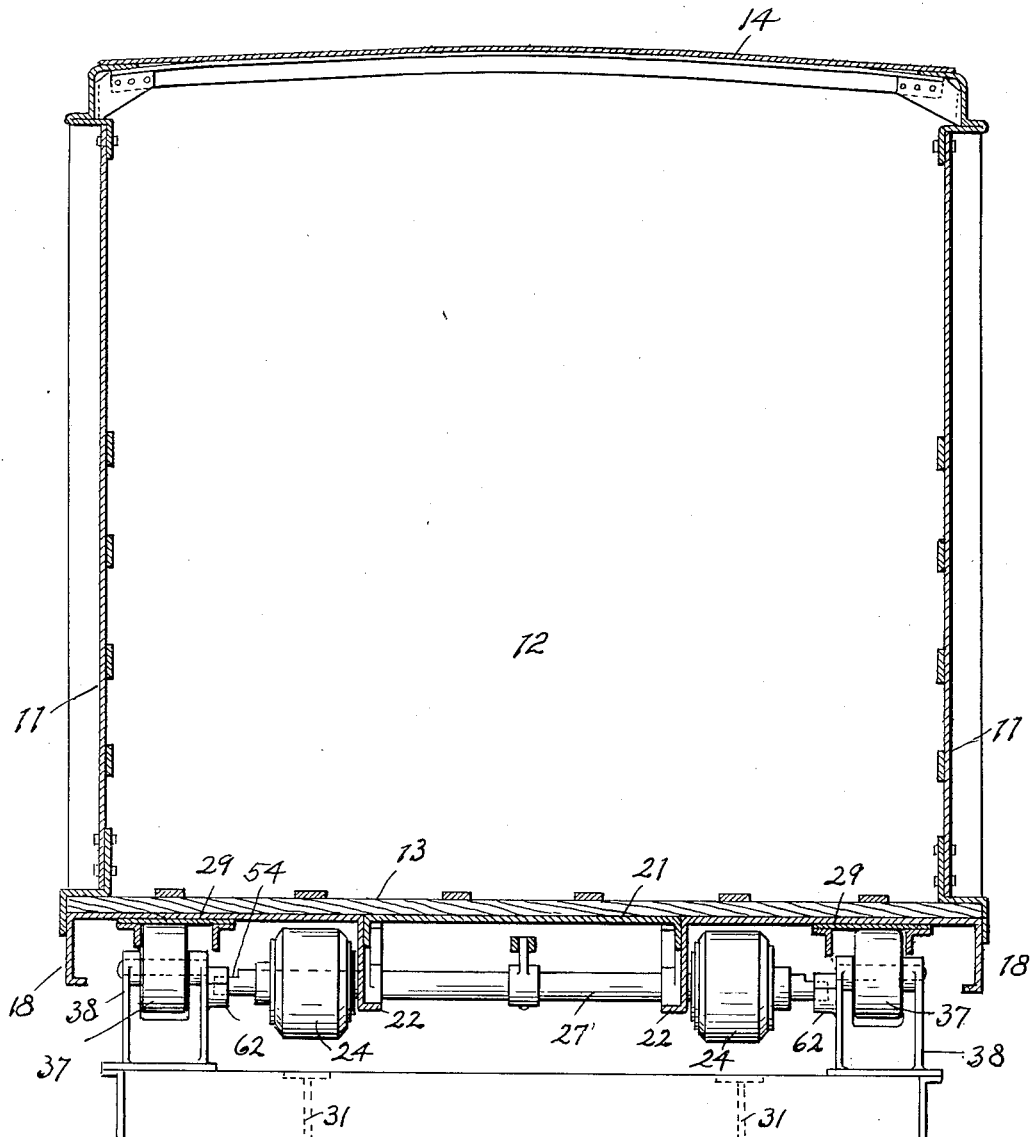
Fig. 2 is a vertical cross-sectional view of the demountable body, as shown in Fig. 1.

The under-structure of the body 10 consists of a pair of pressed steel longitudinally extending side frame members 18 formed, as clearly shown in Fig. 2, of channel-like formation. These side frame members 18 are spaced in parallel relation by a plurality of transverse tube stiffeners 19 suitably spaced apart throughout the length of the side frame members and rigidly connected thereto.

As a further means for reinforcing the side frame members 18, there is provided a front plate 20 and a rear plate 21 having depending flanges adapted to engage with the inner extensions 22 of the side frame members 18 and bolted or otherwise suitably connected thereto. The upper surfaces of the plates 20 and 21 are positioned in horizontal alignment with the upper surfaces of the side frame members 18 so as to present a continuous and flat upper surface upon which the floor 13 can be suitably laid.

The demountable body 10 is supported and moved about upon rubber tire wheels 23 and 24, the wheels 23 being rotatably mounted upon a transverse axle 25 journalled in suitable bearings 26 connected to the front of the side frame members 18 while the wheels 24 are rotatably mounted upon a rotatable transverse axle 27 suitably journalled in bearings 28 secured to the rear portion of the side frame members 18. From the foregoing description, it will be seen that a rigid structure has been provided for supporting the body portion and that the body portion is readily moved from one location to another on its wheels 23 and 24.

Secured to the under side of the side frame members 18 and extending parallel with respect thereto is a pair of longitudinally extending track members 29 of channel formation which are adapted to be engaged by rollers provided upon the chassis of the motor vehicle for supporting the demountable body 10 when the latter is suitably positioned upon the motor vehicle, the function of which will be later more fully described. The front ends of the track members 29 are flared at 30, as clearly shown in Fig. 3, so as to engage the wheels or rollers mounted upon the chassis and guide the body into proper position thereon. These ends 30 are further curved upwardly so as to engage the rollers on the chassis within suitable vertical limits, and the inner flanges of the tracks terminate short of the ends thereof.

The chassis comprises a pair of longitudinally extending side frame members 31 suitably spaced apart and reinforced by transverse spacing members 32 bolted or otherwise secured to the side frame members. The usual tie or gusset plates 33 are provided and are bolted or otherwise secured to the side frame members and the transverse spacing members, respectively, for the purpose of securely tying these members together and reinforcing the chassis throughout. A plurality of rollers are employed for the purpose of supporting the demountable body upon the chassis frame. The rollers 34 are journalled in suitable bearings 35 supported upon and secured to transverse channel supporting members 36 which are connected to the upper and forward portion of the side frame members 31. The rollers 37 are suitably journalled in bearings 38 supported upon plates 39 rigidly connected to the ends of the side frame members 31. It is important that the rollers 34 and 37 be positioned in alignment and so that they substantially engage with the inner surface of the outer flange of the tracks 29 on the demountable body 10.

A pair of intermediate rollers 40 are suitably journalled in bearings 41 bolted or otherwise secured to the side frame members 31 and are positioned so, with respect to the rollers 34 and 37, that they will engage with the inner flange of the tracks 29 of the demountable body 10. This arrangement of the rollers, therefore, permits the demountable body 10 to be introduced onto the chassis of the motor vehicle at an angle within certain limits and as soon as the rollers engage the flanges of the tracks 29, the demountable body will be swung around into its proper position upon the chassis.

To properly position the demountable body 10 upon the chassis of the motor vehicle, there are provided interengaging members secured, respectively, to the chassis and body and at the forward portion thereof. This comprises a receiving member 42 bolted or otherwise secured to the top of the transverse channel supporting members 36 and substantially centrally of the side frame members 31. This receiving member has an upward extension which terminates in a pair of flaring ends 43 and which are adapted to receive the T-head of a depending extension 44 connected to the base 45 of the cooperating member. This cooperating member is bolted or otherwise secured to the front plate 20 and is so positioned that when the demountable body 10 is moved forwardly upon the chassis, the head of the extension 44 engages with the flared ends 43 and is guided into interlocking engagement. This securely holds the forward end of the demountable body 10 against vertical movement. However, to prevent longitudinal movement of the demountable body, a transverse shaft 46 is suitably supported by the transverse channel supporting members 36 and has connected thereto a pair of latch members 47 extending rearwardly and adapted to automatically engage the transverse axle 25 of the demountable body when the latter is moved into its foremost position upon the chassis. These latching members 47 are normally held in engagement with the transverse axle 25 by a spring 48 and are moved to unlatching position against the tension of the spring 48 by a control lever 49 mounted within the cab of the motor vehicle and manually operated by the driver. The lower end of the control lever is connected by a rod 50 to an arm 51 freely mounted on the transverse shaft 46 and has a limited lost motion between a pair of flanges on a lever 52 secured to the shaft 46. When the lever 49 is moved forward or rearward, it engages these flanges and the transverse shaft is oscillated thereby permitting the latching members 47 to be disengaged from the axle 23. This lost motion device is provided for the purpose of permitting additional movement of the latching members 47 if, for any reason, these members should not be disengaged from the axle 25 when the lever 49 is moved to its forward position.

Additional automatic locking mechanism is provided upon the under side of the demountable body 10 and at the rear end thereof and includes the rotatable axle 27 which supports the rollers 24. The outer ends of this axle 27 are provided with flattened portions 54. This axle 27 is rotated by means of a link 55 having one end connected to an extension on the axle 27 while the opposite end is connected to one end of a bell crank lever 56 pivotally connected to a bracket 57 bolted or otherwise secured to the under surface of the rear plate 21. The free end of the bell crank lever 56 is provided with an eye 58 which surrounds a depending pin 59 secured to the under surface of the rear plate 21. This arm of the bell crank lever is maintained in depressed position by a spring 60 disposed between the arm and the plate 21.

The outer ends of the rotatable axle 27 are adapted to slip into a suitable opening 61 provided in the sockets 62 forming part of the bearings 28. These sockets are provided with openings 63 of such a nature that when the flattened portions 54 of the rotatable axle 27 are in the position indicated in Fig. 6, the axle 27 can not pass through the opening 63 but when the free end of the bell crank lever 56 is raised, the axle 27 is rotated until the flattened portions 54 are in substantially horizontal position at which time the axle can freely pass into or out of the opening 61. When the free end of the bell crank lever 56 is released the spring 60 will normally depress the lever and cause the axle 27 to be rotated in the opposite direction and the axle will again be securely locked within the opening 61. The axle will, therefore, be maintained in locked position until the end of the bell crank lever 56 is again raised by any suitable means. From the foregoing description, it will be seen that a second locking means is provided for the rear end of the demountable body 10 which prevents this end of the body from appreciable movement in any direction.

Figure 6:
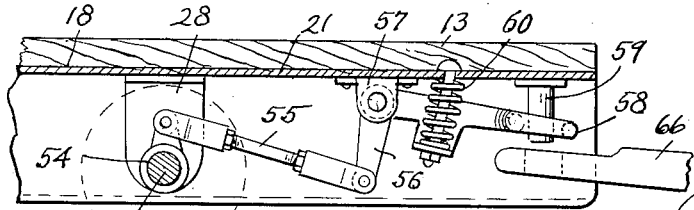
Fig. 6 is an elevational view, partly in section, of the locking mechanism at the rear end of the demountable body.

The mechanism illustrated in Fig. 6 was designed primarily for use with a lifting truck which has a projecting end 66 adapted to engage the pin 59 to pull the truck to any desired location. When the end of the truck is raised into engagement with the pin 59, it also engages the end of the bell crank lever 56 and raises the same in opposition to the spring 60. This movement causes the axle 27 to be rotated until the flattened portions 54 are in substantially horizontal position and, in this position, the demountable body is ready to be removed from the chassis. Just previous to the operation of this mechanism, the latching members 47 are disengaged from the front axle 25 by movement of the lever 49 and the demountable body can then be removed from the chassis.

A plate 64 is secured to the back plate 21 and extends downwardly and is curved to extend partially around the eye 58 of the bell crank lever 56. This plate 64 acts as an engaging and guiding surface for the nose 66 of the truck and assures its proper connection with the depending pin 59.

A pin 65 may be secured to the under side of the front plate 20 for the purpose of providing means engageable by the truck for pulling the demountable body around by the front end instead of the rear end.

When the truck is in engagement with either end of the demountable body, the end of the body can be slightly elevated so as to disengage either set of rollers 23 or 24 from the ground and thereby permit the demountable body to be more easily turned about and transported to the desired location.

While I have described the preferred structure embodying the invention, it is to be understood that changes may be made thereto without departing from the spirit of the invention as defined in the appended claims.

Having thus described my invention, what I claim is:

1. In a motor vehicle, the combination of a chassis, rollers supported by said chassis, some of said rollers being positioned out of alignment with respect to the remaining of said rollers, a demountable body adapted to be moved onto and off of said chassis, trackways secured to said body and having portions engaging the periphery and sides of said rollers to thereby prevent lateral movement of said body with respect to said chassis, means for automatically securing the front end of said body to said chassis, and means for automatically securing the rear end of said body to said chassis to thereby prevent longitudinal movement therebetween.

2. In a motor vehicle, the combination of a chassis, rollers supported by said chassis, a demountable body adapted to be moved onto and off of said chassis, trackways secured to said body and adapted to engage said rollers, transverse axles mounted on said body, means carried by said chassis adapted to automatically engage one of said axles to secure said body to said chassis, and means carried by said body and associated with the other of said axles for securing said body to said chassis.

3. In a motor vehicle, the combination of a chassis, rollers supported by said chassis, a demountable body adapted to be moved onto and off of said chassis, trackways secured to said body and adapted to engage said rollers, transverse axles mounted on said body, means carried by said chassis adapted to automatically engage one of said axles to secure said body to said chassis, locking sockets provided on said chassis, and means carried by said body and associated with the other of said axles for engagement between the latter and said sockets for securing said body to said chassis.

4. In a motor vehicle, the combination of a chassis, rollers supported by said chassis, a demountable body adapted to be moved onto and off of said chassis and supported by said rollers, axles mounted on said body, locking sockets provided on said chassis adapted to receive one of said axles, and means associated with one of said axles for moving the latter so as to be engageable with said sockets to thereby secure said body to said chassis.

5. In a motor vehicle, the combination of a chassis, rollers supported by said chassis, a demountable body adapted to be moved onto and off of said chassis and supported by said rollers, axles mounted on said body, locking sockets provided on said chassis adapted to receive one of said axles, means for normally retaining said axle within said sockets, said means having a projecting eye, a member by which said body can be moved about and associated with said eye, means for raising said eye so as to release said axle from said sockets, and a member secured to said body to guide the last mentioned means into engagement with said body moving member for removing said body from said chassis.

6. In a motor vehicle, the combination of a chassis, a plurality of rollers mounted on said chassis, a demountable body adapted to be moved onto and off of said chassis, trackways on the bottom of said body adapted to be engaged by said rollers when said body is disposed upon said chassis, axles mounted on said body, cooperating means at the front end of said body and chassis for preventing vertical movement therebetween, means carried by said chassis for automatically engaging the front axle to prevent horizontal movement of said body on said chassis, manually operable means for disengaging said last mentioned means from said front axle, means mounted on said chassis and engageable with the rear axle, and mechanism carried by said body and associated with said rear axle for normally maintaining the latter in locking engagement with said last mentioned means, the operation of said mechanism imparting rotation of said rear axle to release said axle from its locking engagement.

JAMES HOLAN.